US006467274B2

(12) United States Patent
Barclay et al.

(10) Patent No.: US 6,467,274 B2
(45) Date of Patent: Oct. 22, 2002

(54) APPARATUS AND METHODS FOR COOLING AND LIQUEFYING A FLUID USING MAGNETIC REFRIGERATION

(75) Inventors: John A. Barclay, Monroe, WA (US); Thomas C. Brook, Vancouver (CA)

(73) Assignee: University of Victoria Innovations & Development Corp., Victoria (CA)

( * ) Notice: Subject to any disclaimer, the term of this patent is extended or adjusted under 35 U.S.C. 154(b) by 0 days.

(21) Appl. No.: 09/850,725

(22) Filed: May 7, 2001

(65) Prior Publication Data

US 2002/0040583 A1 Apr. 11, 2002

Related U.S. Application Data

(60) Provisional application No. 60/202,266, filed on May 5, 2000.

(51) Int. Cl.$^7$ .............................. F25B 21/00; F25J 1/00

(52) U.S. Cl. ........................................... 62/3.1; 62/607

(58) Field of Search ........................... 62/3.1, 606, 607, 62/608

(56) References Cited

U.S. PATENT DOCUMENTS

| | | | |
|---|---|---|---|
| 3,108,444 A | 10/1963 | Kahn | |
| 4,408,463 A | 10/1983 | Barclay | |
| 4,507,927 A | 4/1985 | Barclay | |
| 4,704,871 A | 11/1987 | Barclay et al. | |
| 4,727,722 A | * 3/1988 | Kirol | 62/3.1 |
| 4,785,636 A | * 11/1988 | Hakuraku et al. | 62/3.1 |
| 5,182,914 A | 2/1993 | Barclay | |
| 5,249,424 A | 10/1993 | DeGregoria et al. | |
| 5,743,095 A | 4/1998 | Gschneidner, Jr. et al. | |

FOREIGN PATENT DOCUMENTS

FR  83 00770  7/1983

OTHER PUBLICATIONS

Barclay, John A., "Prospects for Magnetic Liquefaction of Hydrogen," Proceedings of the XVIIIth International Congress of Refrigeration, Montreal, Quebec, Aug. 10–17, 1997, pp. 297–305.

Barclay, John A., "Active and passive magnetic regenerators in gas/magnetic refrigerators," *Journal of Alloys and Compounds*, 207/208 (1994) 355–361.

Reid, C.E., Barclay, J.A., Hall, J.L. and Sarangi, S., "Selection of magnetic materials for an active magnetic regenerative refrigerator," *Journal of Alloys and Compounds*, 207/208 (1994) 366–371.

Barclay, J.A., "Cryofuels, Now and in the Future," 1995 Cryogenic Engineering Conference (CEC), Jul. 1721, 1995, Columbus, Ohio, *Advances in Crygenic Engineering*, vol. 41B, pp. 1015–1031 (1996).

Hall, J.L., Reid, C.E., Spearing, I.G. and Barclay, J.A., "Thermodynamic Considerations for the Design of Active Magnetic Regenerative Refrigerators," *Advances in Cryogenic Engineering*, vol. 41B (1996).

Mérida, W.R., and Barclay, J.A., "Monolithic Regenerator Technology for Low Temperature (4 K) Gifford–McMahon Cryocoolers," CEC/ICMC 1997, Portland, Oregon, Jul. 28–Aug. 1, 1997, accepted for publication in *Advances in Cryogenic Engineering*, vol. 43 (1998).

(List continued on next page.)

Primary Examiner—William C. Doerrler
(74) Attorney, Agent, or Firm—Klarquist Sparkman, LLP

(57) ABSTRACT

Methods and apparatus for magnetically cooling and liquefying a process stream include a plurality of active magnetic regenerative refrigerators (AMRRs) configured in parallel or in series and parallel. Active magnetic regenerative liquefiers (AMRLs) include such AMRRs and are configured to liquefy, for example, natural gas or hydrogen. In specific embodiments, a magnetic field is produced by hexagonally arrayed solenoids and magnetic refrigerants are selected to provide a thermal mass that is dependent on an applied magnetic field.

9 Claims, 5 Drawing Sheets

OTHER PUBLICATIONS

Hall, J.L. and Barclay, J.A., "Analyzing Magnetic Refrigeration Efficiency: A Rotary AMR—Reverse Brayton Case Study," *Advances in. Cyrogenic. Engineering*, vol. 43, 1998.

L. Zhang "Design optimization of a 0.1–ton/day active magnetic regenerative hydrogen liquefier," *Cryogenics*, 40:269–278 (Apr. 2000).

* cited by examiner

APPARATUS AND METHODS FOR COOLING AND LIQUEFYING A FLUID USING MAGNETIC REFRIGERATION

This application claims the benefit of provisional application 60/202,266 filed May 5, 2000.

FIELD OF THE INVENTION

The invention pertains to methods and apparatus for liquefying cryofuels.

BACKGROUND OF THE INVENTION

Cryogenic liquefaction of gases can be accomplished through a variety of methods, some involving mechanical cycles with gaseous refrigerants, others making use of cycles using the thermodynamic properties of magnetic materials.

Gases such as hydrogen and natural gas are commonly liquefied by processes in which the gas to be liquefied, also called the process stream, is used as the working fluid in a mechanical cycle such as the Claude cycle, Linde cycle, or Brayton cycle, involving compression and subsequent expansion of the working fluid. Various implementations of the Claude cycle into liquefiers have achieved a maximum relative efficiency or figure of merit of about 37%. A figure of merit (FOM) is a ratio of the ideal minimum work that must be supplied to liquefy a quantity of a gas to the actual work that is supplied to liquefy the same quantity of the gas. The ideal work differs for each fluid that is liquefied.

Liquefiers can also have a working fluid loop separate from the process stream. In such devices, the working fluid or refrigerant is separate from the process stream fluid. The cooling provided by the refrigerants in a thermodynamic cycle cools and eventually liquefies the process stream fluid. The coupling between the process stream and working fluids is normally accomplished by one or more heat exchangers. A regenerative magnetic refrigerator that operates as a liquefier is an example of this type of liquefier, where the process stream is separate from the refrigerant.

A regenerative magnetic refrigerator uses working materials such as magnetic solids whose magnetic order or magnetic entropy depends on temperature and applied magnetic field. With such a magnetic refrigerant, cooling is accomplished by a mechanical cycle as follows: The magnetic refrigerant is adiabatically placed in a magnetic field. The conservation of total entropy in this adiabatic process requires that the refrigerant increase in temperature to compensate for the increased order in the magnetic moments or decrease in magnetic entropy of the magnetic refrigerant due to the external magnetic field. This temperature change is sometimes called the adiabatic temperature change and it can be used to transfer heat to a thermal sink with a corresponding decrease in refrigerant temperature. The magnetic refrigerant is then removed adiabatically from the magnetic field, producing a corresponding temperature decrease. This temperature decrease can be used to accept heat from a thermal load with a corresponding material temperature increase. (The change in temperature of a magnetic material that occurs as a result of an adiabatic change in externally applied magnetic field is called the magnetocaloric effect.) The magnitude of this temperature change is typically about 2 K per Tesla or a total of about 10–15 K for 5–6 T. To increase the temperature span between the average hot temperature or thermal-sink temperature, and average cold temperature or thermal-load temperature, it is normal to use regenerative steps in the cycle. Thus, the basic regenerative magnetic cycle consists of: adiabatic temperature increase upon magnetization; heat transfer to a thermal sink; regenerative heat transfer to decrease the magnetized magnetic refrigerant average temperature; adiabatic temperature decrease upon demagnetization; heat transfer from the thermal load; and regenerative heat transfer to increase the demagnetized magnetic refrigerant average temperature back to the starting temperature of the cycle. Such regenerative magnetic cycles, where the regenerative function of the cycle is accomplished by the solid working magnetic refrigerant, are called active magnetic regenerative cycles. Refrigerators based on such cycles are called active magnetic regenerative refrigerators. Active magnetic regenerative refrigerators (AMRRs) can be used as liquefiers (active magnetic regenerative liquefiers "AMRLs")) to cool a process stream.

Prior art magnetic refrigeration systems for liquefying gases present the following drawbacks:

1) high magnetic fields are required for efficient refrigeration;
2) superconducting magnets in Helmholtz configurations, used in some embodiments of magnetic refrigerators to produce the necessary magnetic fields, are expensive;
3) immersion cooling of superconducting magnets with liquid helium is difficult and expensive;
4) design and construction of high-performance, multi-material magnetic regenerators required for optimal, reliable, long-lived active magnetic regenerative devices with brittle magnetic refrigerants is difficult;
5) design of housings to contain heat-transfer fluids and to control the flow of these fluids through magnetic regenerators with reliable sealing mechanisms is difficult;
6) there are intrinsic limitations on the FOM of various configurations of multistage refrigerators for the purpose of gradually cooling and liquefying a process stream; and
7) high frequency, high efficiency operation has not been achieved.

SUMMARY OF THE INVENTION

In view of the shortcomings of the prior art, the present invention provides, inter alia, active magnetic regenerative refrigerator (AMRR) systems including one or more of the following features:

(a) increased efficiency through the use of multiple-stage active regenerative magnetic refrigerators with an external process stream to achieve liquefaction of a gas, instead of a gas cycle that uses the process stream as the working fluid;

(b) increased efficiency through a parallel or series-parallel configuration of multiple refrigeration stages, that effectively pump heat from a thermal load in a process stream to a hot bath at room temperature or other common thermal sink temperature;

(c) increased overall efficiency by recognition that a mathematical optimization of cold temperatures for each stage can permit the total work performed by a multistage liquefier to be reduced;

(d) increased efficiency through an ortho-para catalysis of the process stream continuously as a process stream is cooled;

(e) efficient coupling of a magnetic refrigerant and a heat-transfer fluid in a porous regenerator matrix composed of selected magnetic materials configured in geometries to reduce entropy generation;

(f) for each stage or selected stages, an admixture of magnetic materials comprising the magnetic refrigerants, wherein the admixture is optimized or otherwise configured for a particular operating temperatures of that stage;

(g) counterflow heat exchangers for each refrigeration stage (or selected stages), allowing additional cooling of a process stream with a portion of a regenerator heat-transfer fluid as the fluid is returned to room temperature in parallel with flow through the regenerators, thus allowing a greater utilization of the heat-transfer fluid for more efficient cooling of the process stream (such "fluid bypass" of the regenerator is effective because the thermal mass of a magnetic regenerator can be configured to be lower in a higher magnetic field than in a lower magnetic field, so that there is more flow from hot to cold than from cold to hot in a balanced flow regenerator);

(h) in multiple-stage systems, an arrangement of inexpensive, solenoidal, superconducting magnets configured with alternating magnetic field directions that simultaneously enhances core fields in the solenoids and provides a magnetic flux return path for adjacent solenoids reducing stray magnetic fields;

(i) a hexagonal configuration of superconducting magnets in a six-stage embodiment;

(j) conductively cooled superconducting magnets using a multistage, small capacity cryocooler;

(k) a sealing arrangement and housing configuration such that a small, controlled leakage of heat-transfer fluid occurs as heat-transfer fluid flow is directed through the moving regenerators segments; and (l) a stage comprising an active magnetic regenerative refrigeration (AMRR) device that includes a linked chain or conveyor belt of magnetic refrigerating regenerators or segments, constructed of magnetic materials with tunable ordering temperatures that withstand repeated thermal stress due to heating and cooling, while remaining intact and functional.

Methods and apparatus according to the invention allow, inter alia, cooling of a gas, such as hydrogen or natural gas, to the point of liquefaction utilizing refrigeration by adiabatic magnetization/demagnetization of selected solid magnetic refrigerants in an active magnetic regenerative cycle.

The foregoing and additional features and advantages of the present invention will be more readily apparent from the following detailed description, which proceeds with reference to the drawings.

DETAILED DESCRIPTION OF THE INVENTION

Figure 1:
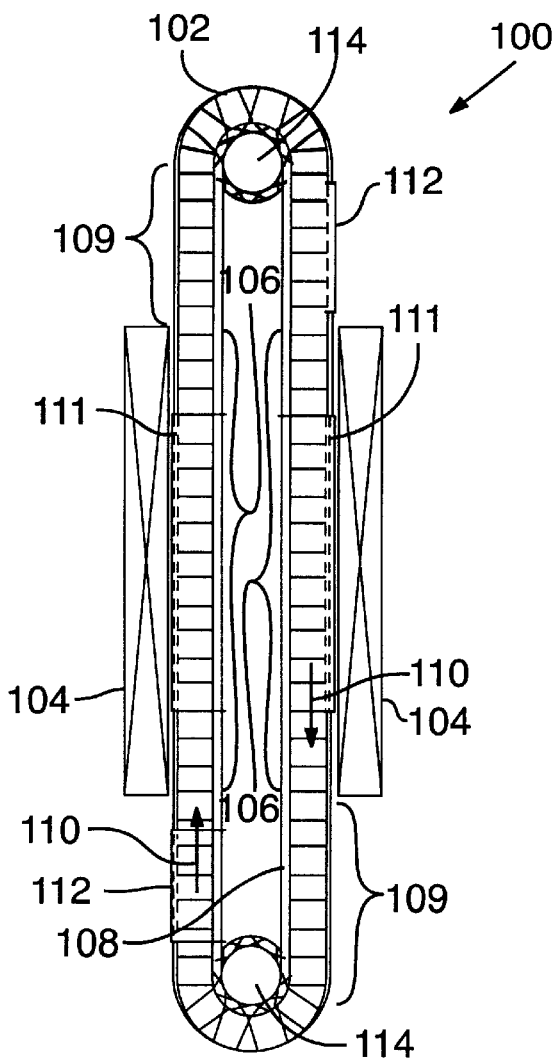
FIG. 1(A) is a schematic vertical section of a first representative embodiment of an active magnetic regenerative refrigerator (AMRR).
FIG. 1(B) is an isometric schematic representation of certain operational aspects of the AMRR of FIG. 1(A).
Figure 1:
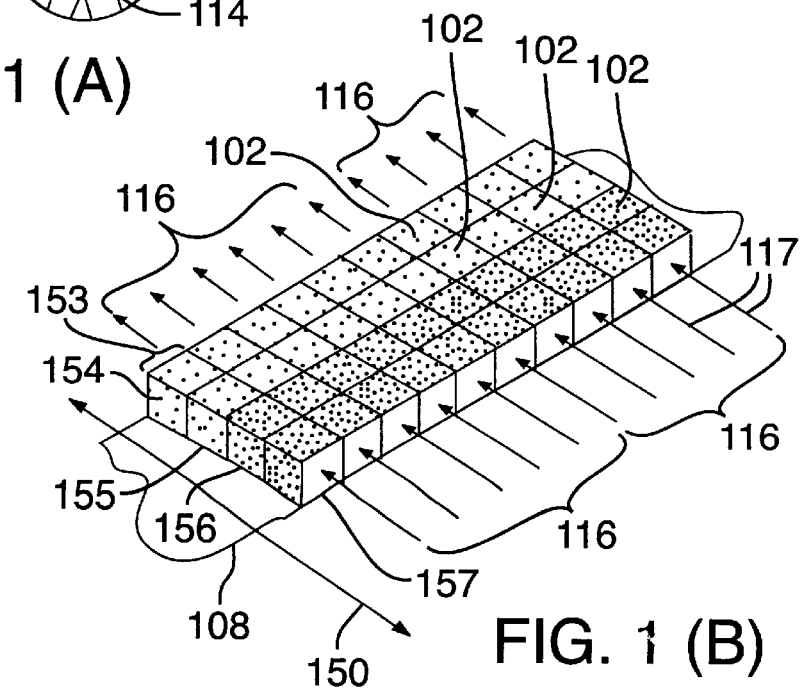

FIGS. 1(A) and 1(B) depict certain aspects of a stage 100 of an active magnetic regenerative refrigerator (AMRR) according to a first representative embodiment. As shown in FIG. 1(A), the AMRR stage 100 comprises multiple regenerative magnetic refrigerating segments ("segments") 102 mounted on a flexible conveyor belt 108 that is driven by rollers 114 or other supports. The segments 102 comprise a magnetic refrigerant, or a mixture of magnetic refrigerants, embedded in a porous matrix that allows a heat-transfer fluid, directed at the matrix, to pass through the segments 102.

A portion ("hot-blow zone") 106, of a path traversed by the segments 102 as moved by the conveyor belt 108 is surrounded by a superconducting magnet 104. In the hot-blow zone 106, heat is released by the segments 102 that have a higher average temperature due to adiabatic magnetization of the magnetic refrigerants in a strong magnetic field produced by the superconducting magnet 104. As shown in FIG. 1(B), the released heat is delivered to an external heat sink by a heat-transfer fluid 116 that flows through the segments 102 that are situated in the hot-blow zone 106.

A portion "cold-blow zone" 109 of the path traversed by the segments 102 is situated outside a high magnetic field region and the hot-blow zone 106. The segments 102 exit the hot-blow zone 106, pass through a no-flow zone 118, and then enter the cold-blow zone 109. The cold-blow zone 109 is a region of low applied magnetic field where the segments 102 are colder due to adiabatic demagnetization in the no-flow zone 118. In the cold-blow zone 109, the segments 102 absorb heat from the heat-transfer fluid 116 that is directed through the segments 102.

As the segments 102 move along directions 110, the segments 102 enter the hot-blow zone 106 produced by the superconducting magnet 104. In a no-flow zone 122 wherein no heat-transfer fluid passes through the segments, prior to the segments 102 entering into the hot-blow zone 106, the magnetic field tends to align the magnetic moments of the magnetic refrigerant(s) within each segment 102 along a magnetic field direction of the magnetic field produced by superconducting magnet 104. As a result of such alignment, along the long axis of the regenerative segment comprising one or more magnetic materials in the no-flow zone 122, the magnetic refrigerants increase in temperature through an adiabatic temperature change for each of the respective magnetic materials. Typically, the segments 102 include one or more magnetic materials that are configured so that a composition of the segments 102 varies along an axis 150.

As shown in FIGS. 1(A)–1(B), the hot-blow zone 106 is defined by a duct 111 that directs the heat-transfer fluid 116 (e.g., helium or other fluid) through the segments 102 within the duct 111 so that the heat-transfer fluid 1 16 absorbs heat from the segments 102. The heat-transfer fluid 116 is then circulated to a hot reservoir (not shown) where the heat-transfer fluid 116 releases the heat that was absorbed through thermal contact with the segments 102.

After passing through the hot-blow zone 106, the segments 102 enter the no flow zone 118 of reduced magnetic field, and the cold-blow zone 109. In the cold-blow zone 109, the magnetic field is substantially less than that of the hot-blow zone 106. In the no-flow zone 118, adiabatic demagnetization of the magnetic refrigerant in the segments 102 occurs. Adiabatic demagnetization results in accompanying temperature drops throughout the segments 102. A duct 112 in the cold-blow zone 109 directs the heat-transfer fluid 116 through the porous magnetic refrigerating segments 102 passing through the duct 112. The heat-transfer fluid 116 is cooled by contact with the segments 102 near the coldest temperature of the particular stage of the multistage liquefier. After passing through the cold-blow zone 109, the resulting cooled heat-transfer fluid 116 is then brought into thermal contact with a process stream (not shown) in a process heat exchanger, cooling the process stream.

The conveyor belt 108 is constructed of a material capable of withstanding the stress of repeated temperature oscillations and other cyclic magnetic-related stresses. By way of example, one suitable material is #316 stainless steel. On the conveyor belt 108, the segments 102 are arranged in a regular matrix of multiple rows. For example, as shown in FIG. 1(B), each row contains four segments 102. Also, by way of example, each segment 102 shown in FIG. 1(B) is orthorhombic (brick-like) in shape.

The optimal size of the segment 102 is selected by minimizing the generation of entropy from several mechanisms such as heat transfer, pressure drop of the heat-transfer fluid, thermal conduction along the long axis of the regenerative segment, and eddy current heating. The typical axial length to facial dimension aspect ratio of the segment from this analysis is approximately 3 to 1. The linear dimension of the face of the orthorhombic segment may be of order of one inch or more and the surfaces of the segments 102 are configured to seal the heat transfer fluid within the duct and regenerator.

Representative geometries of the magnetic refrigerants include particles approximately 100–200 μmicrometers in diameter, fine wires, or thin, closely spaced sheets. However, any of various other sizes and/or shapes can be used as conditions of use indicate. Each segment 102 comprises at least one magnetic refrigerant material (desirably an appropriately layered admixture of more than one such material) combined in a monolithic, high strength matrix. For example, International Application No. PCT/US97/1 8059 (International Publication No. WO 98/28585), incorporated herein by reference, teaches one method of combining brittle magnetic refrigerants into a monolithic regenerative segment. Typical magnetic refrigerants include relatively ductile rare earth elements and alloys such as Gd, Dy, $Gd_xDy_{1-x}$, $Gd_xHo_{1-x}$, $Tb_xDy_{1-x}$, brittle intermetallic compounds such as $Gd_5(Si_xGe_{1-x})_4$, GdZn, $GdNi_2$, $DyAl_2$, $ErAl_2$, and at temperatures below about 20 K, dielectric magnetic compounds such as $Gd_3Ga_5O_{12}$. U.S. Pat. No. 5,887,449 to Pecharsky and Gshneidner, incorporated herein by reference, teaches an active magnetic refrigerant comprising $DyAl_2$ and a low-temperature stage including an active magnetic refrigerant comprising $(Dy_{1-x}Er_x)Al_2$, wherein x is selected to be greater than about 0.5 and less than 1 so as to be rich in erbium. An alternative high-temperature-stage active magnetic refrigerant may comprise $(Dy_{1-x}Er_x)Al_2$ where x is selected to be greater than 0 and less than about 0.3. A preferred low-temperature-stage active magnetic refrigerant comprises $(Dy_{1-x}Er_x)Al_2$, wherein x is selected to be from about 0.6 to about 0.9. U.S. Pat. No. 5,743,095 to Gshneidner, Jr. et al., incorporated herein by reference, provides an active magnetic regenerator and method that use a magnetic refrigerant $Gd_5(Si_x Ge_{1-x})_4$ where $0 \leq x \leq 0.55$. The segments 102 can include such intermetallic compounds, other similar compounds, as well as compounds of other rare earth materials.

The magnetic refrigerants are typically selected to have ordering temperatures close to their operational temperatures. For example, in a multistage series-parallel configuration of a magnetic liquefier for hydrogen, the various stages span temperatures from less than about 20 K to about 300 K. Each regenerative segment on the corresponding rotating chain in that stage of the AMRR operates over a limited temperature range near its particular ordering temperature where its adiabatic temperature change is largest and most easily accomplished by the action of the applied magnetic field. Each magnetic refrigerant typically operates most efficiently over a temperature range of about 20–40 K from the ordering temperature and below the ordering temperature so that each AMRR stage typically has segments with 2–10 or more different magnetic materials. A stage operating from about 260 K to about 300 K typically requires only one magnetic refrigerant. The exact makeup and arrangement of the segments 102 depend upon, inter alia, the temperature span of the refrigeration stage in which the particular AMRR is intended to be used.

The heat-transfer fluid 116 is a substance, typically a gas such as helium, having heat-transfer characteristics that permit efficient transfer of heat between the heat-transfer fluid 116 and the segments 102, as well as efficient heat transfer between the heat-transfer fluid 116 and the process stream (not shown).

In a first representative embodiment, the segments 102 are compactly and reliably attached to the conveyor belt 108. As the conveyor belt 108 moves around the supports or rollers 114 the conveyor belt 108 bends, and the segments 102 that are attached to the conveyor belt 108 partially separate and come tightly back together again. The heat-transfer fluid flows primarily through the segments, rather than between or over or under the segments in the hot-blow or cold-blow zones. The heat-transfer fluid is prevented from flowing in the no-flow zones of the cycle. The sealing mechanism includes a primary seal that is a spring-loaded frontal facial seal of a low friction, wear resistant material such as RULON™, TEFLON™, or tetrafluoroethylene, or other fluoropolymer loaded with graphite or other toughening materials that contacts ends of the magnetic segments that are tightly fitted together with a thin sealing material between them. The tops and bottoms of the segments 102 also have seals that fit into the housing and lightly contact the segments 102 on the conveyor belt 108.

The AMRR shown in FIG. 1(A) can be regarded as a single refrigerator "stage." An active magnetic regenerative liquefier (AMRL) typically comprises multiple AMRR stages configured so that each stage is configured for cooling an AMRR process stream in a selected temperature range. By way of example, as noted below, an AMRL, according to the invention, can comprise six AMRR stages, each with corresponding hot-blow zones 106, no-blow zones 118, 122, cold-blow zones 109, ducts 111, 112, conveyor belt 108, and array of magnetic refrigerating segments 102. In each stage, the superconducting magnet 104 can comprise a respective coil of superconducting wire, or solenoid, mounted on a support structure. In an example refrigeration system that includes multiple stages (e.g., six stages), the superconducting magnet is configured as a corresponding array of the respective coils of superconducting wire on the support structure. Each coil provides a respective region of high magnetic field for the respective stage of refrigeration In a series-parallel multiple-stage refrigerator system, according to the invention, the lower stages have the next higher cold temperature as the hot temperature reservoir temperature and higher stages have the same hot reservoir temperature, usually room temperature, about 300 K.

Referring further to FIG. 1(B), a representative magnetic segment 153 includes subsegments 154–156 that are selected based on a temperature range anticipated in the segment 153. Typically the subsegments are selected to obtain a relatively higher thermal mass in a low or zero magnetic field, and a lower thermal mass in a higher magnetic field. In alternative embodiments, the segments 102 can be layered or graded magnetic refrigerants.

Figure 2:
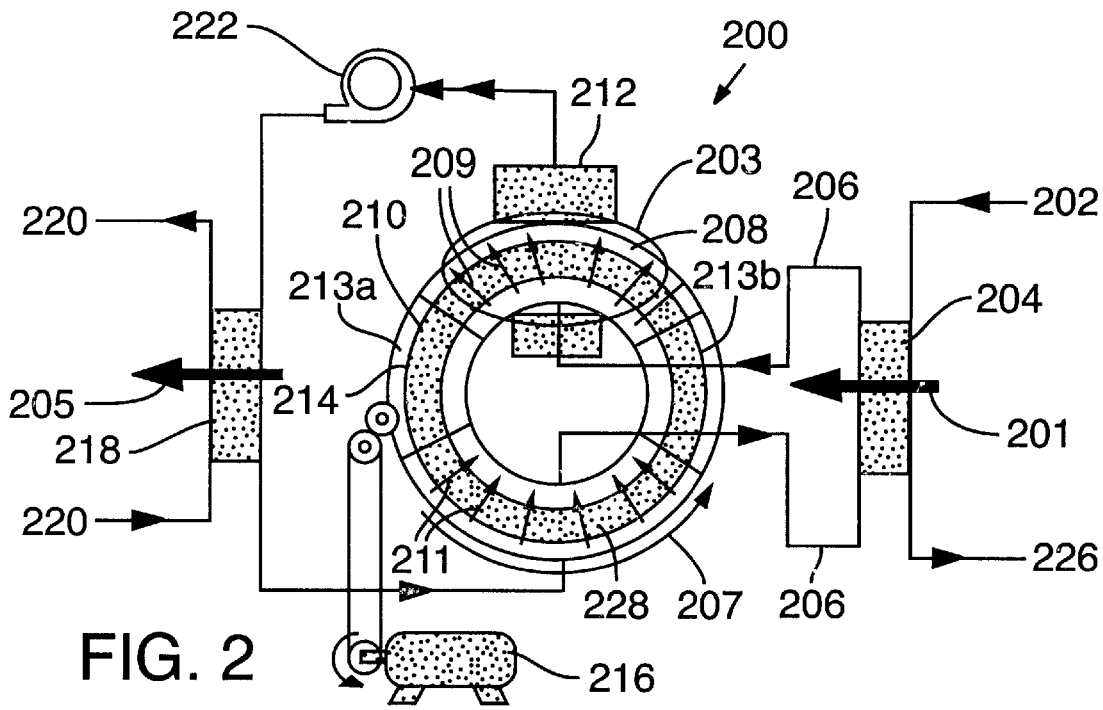
FIG. 2 is a schematic diagram of a second representative embodiment of an AMRR according to the invention.

FIG. 2 schematically depicts a second embodiment of a refrigerator stage. A magnetic material 210, e.g., an ordered magnetic substance bound in a matrix, is configured on a rotating drum or wheel 214. A motor 216 rotates the drum 214 about an axis (rotation denoted by arrow 207). A process stream at a starting temperature, e.g., room temperature, enters at an inlet 202. The process stream exits at (or below) its condensation temperature at an outlet 226. A first heat exchanger 204 removes heat from the process stream. A pump 222 propels a first heat-transfer fluid 206 (e.g., helium) through the first heat exchanger 204, thereby conducting heat away (arrow 201) from the first heat exchanger. The first heat-transfer fluid 206 then flows through a hot-blow zone 208 where the first heat-transfer fluid 206 removes heat (arrows 209) from an ordered magnetic material 210 situated in a region (ellipse 203) of high magnetic field supplied by a magnetic coil 212 that surrounds a portion of the rotating drum 214. The first heat-transfer fluid 206 then flows through a second heat exchanger 218 that removes heat from the first heat-transfer fluid 206 and expels the heat (arrow 205) to a hot reservoir (not shown) via a second heat-transfer fluid, which enters the second heat exchanger 218 at an inlet 220, and exits at an outlet 222. The first heat-transfer fluid 206 then flows through a cold-blow zone 228, a region of reduced magnetic field where the ordered magnetic material present in the cold-blow zone 228 is reduced in temperature due to adiabatic demagnetization. Here, additional heat is removed (arrows 211) from the first heat-transfer fluid 206 by the ordered magnetic material 210. Between the hotblow zone 208 and cold blow zone 228 are "no-flow zones" 213a, 213b in which substantially no heat flow occurs.

Figure 3A:
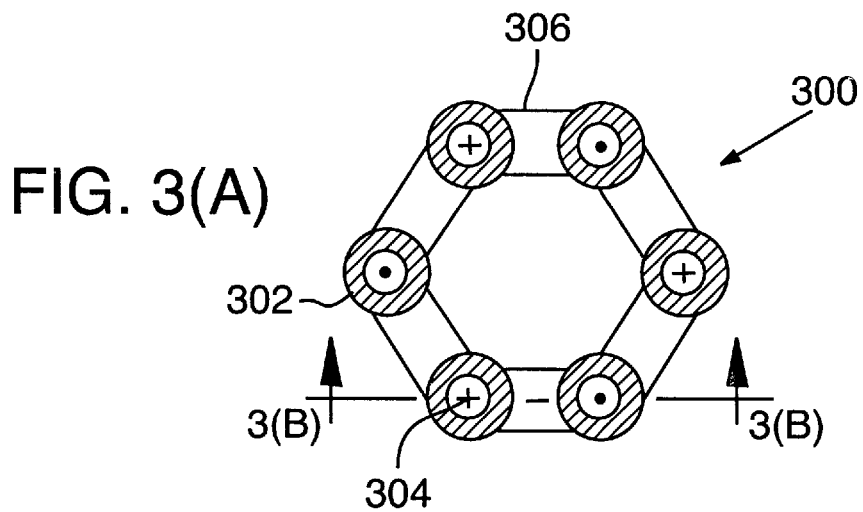
FIGS. 3(A) and 3(B) are schematic horizontal and vertical sections, respectively, of a superconducting magnet array comprising six superconducting magnets, each of which is used in an AMRR such as that in FIG. 1.

FIG. 3(A) depicts a representative embodiment of a superconducting magnet array 300 that supplies the respective magnetic fields to a set of six AMRR stages.

This arrangement of superconducting coils can also be used to supply magnetic field in an embodiment of, for instance, less than six AMRR stages. It is possible, for instance, for one AMRR stage to use one solenoid for a portion of the conveyor belt travelling in one direction, and a second solenoid for another portion of the conveyor belt travelling in the opposite direction, and so have six solenoids for three stages. Also, the total number of coils can, for instance, be reduced.

The superconducting magnet array 300 shown comprises six superconducting solenoidal magnet coils 302, each centered at a vertex 304 of a hexagon. The direction of the field of each coil 302 is opposite to the direction of the respective fields of each of the two adjacent coils 302. A support structure 306 supports the coils 302 in their proper orientation and position relative to each other, and provides a magnetic-flux return path and a thermal bus for the entire array.

Figure 3B:
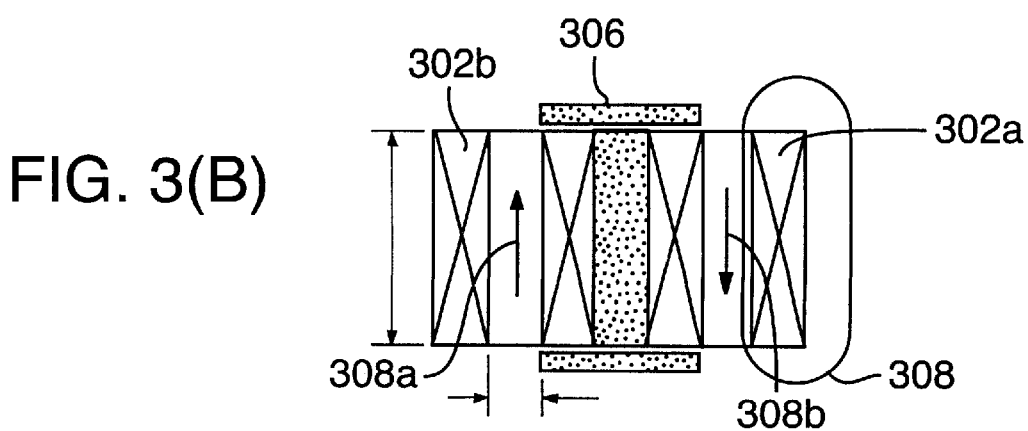

FIG. 3(B) is a side view of a portion of the superconducting magnetic array of FIG. 3(A), showing the support structure 306 and (in this view) two superconducting solenoidal magnetic coils 302a, 302b, respectively. The support structure 306 is constructed of, e.g., soft iron, to provide a flux-return path and a heat-conduction path to conductively cool the superconducting magnetic array. Each of the six superconducting magnet coils 302 surrounds a respective conveyor-belt AMRR stage (such as the embodiment of FIG. 1(A)), thereby providing the region of high magnetic field to the respective AMRR stage. Also shown in FIG. 3(B) are respective orientations of the magnetic coils 302a, 302b and respective directions (arrows 308a, 308b) of the magnetic fields B. As can be seen, the magnetic-field direction alternates for each adjacent superconducting solenoidal magnet coil 302. According to alternative embodiments, two, four, six, eight or other even number solenoids can be arranged to provide a suitable magnetic field.

Figure 4:
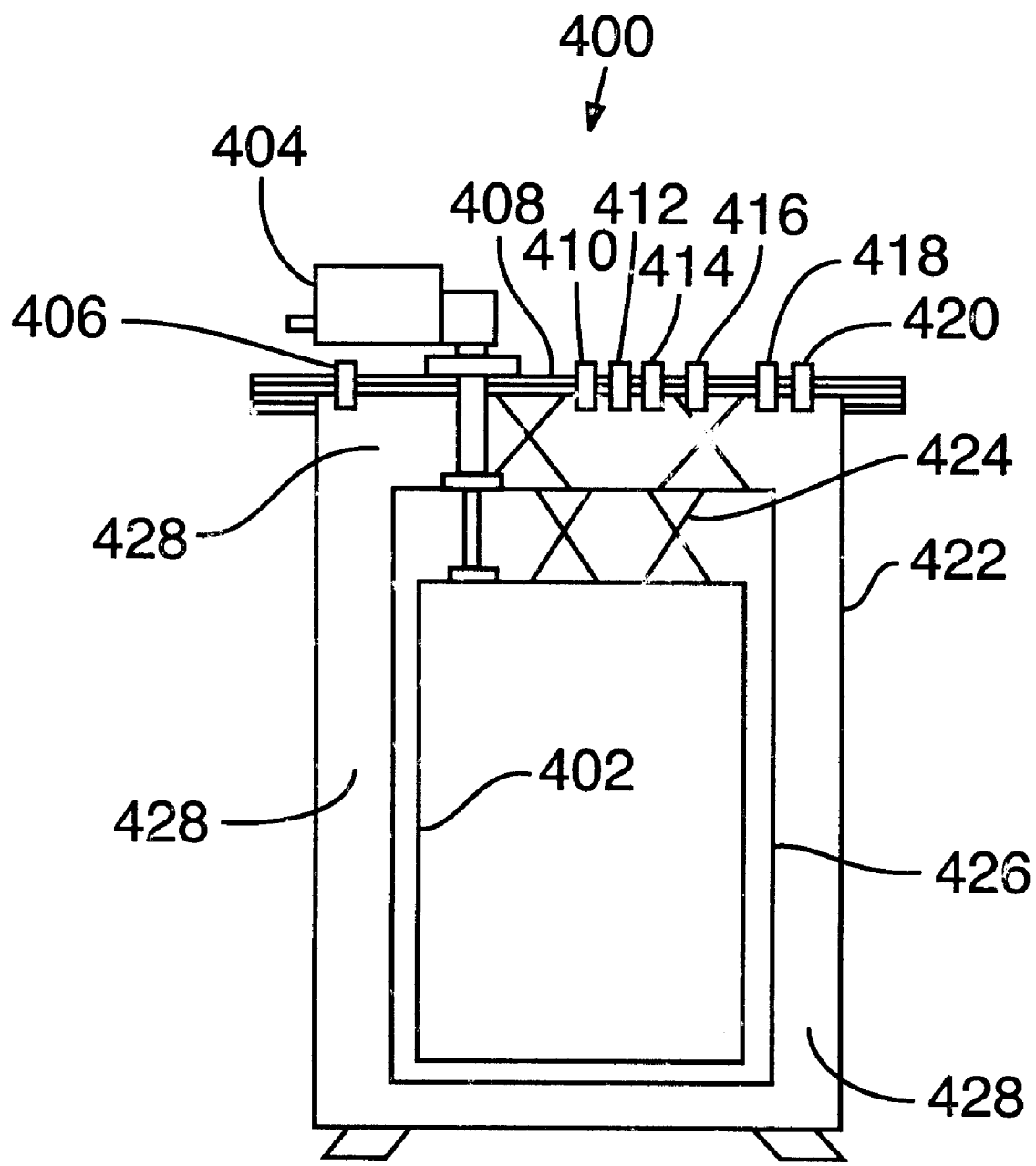
FIG. 4 is a schematic elevational diagram of a representative cryocooler for cooling a superconducting magnet assembly.

FIG. 4 depicts a representative embodiment of a cryostat 400 for maintaining a superconducting magnetic array at, for example, 4.2 K. The superconducting magnetic array is situated in an inner chamber 402 of the cryostat 400. In the inner chamber 402, the superconducting magnetic array is cooled to the desired temperature by a two-stage cryo-cooler 404 such as, for example, a pulse tube or Gifford McMahon device. Electrical power is supplied to the superconducting magnet array via a feed-through 406. Once the magnets are fully charged, they can be put into persistent mode and the power supply turned off. A removable cover 408 permits accessibility to the interior of the cryostat 400. Conduits for instrumentation and magnet control are routed into the cryostat 400 via a feed-through 410. A drive feed-through 412 provides access into the cryostat for the drive motors that actuate the respective conveyor belt(s) for each stage. A vacuum-insulation chamber 428 of the cryostat 400 is evacuated via a vacuum port 414. A feed-through 416 provides a conduit into the cryostat 400 of the heat-transfer fluid to permit the heat-transfer fluid to circulate through the respective regions of high magnetic field. A process-stream input feed-through 418 allows access of the process stream, to be cooled, into the cryostat. The process stream exits the cryostat 400 through an output feed-through 420. A vacuum-tight housing 422 encases the entire cryostat 400. The inner chamber 402 desirably is supported in the housing 422 by supports 424, constructed of a material (e.g., fiberglass) having low thermal conductivity. A thermal shield 426 is situated between the inner chamber 402 and the housing 422. The thermal shield is maintained at a temperature of, e.g., 40 K, so as to thermally insulate the inner chamber 402 from the external environment.

Figure 5:
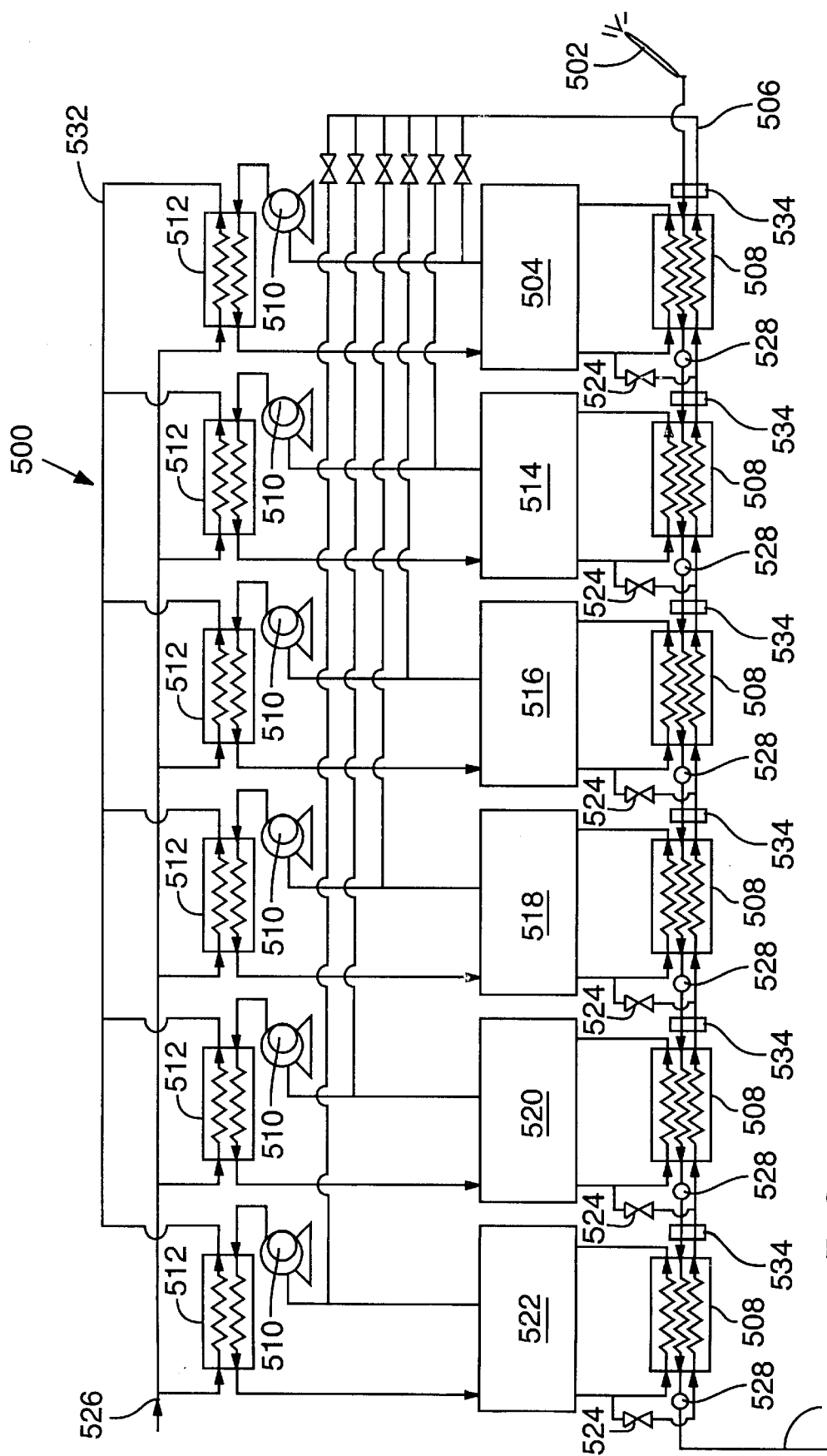
FIG. 5 is a schematic diagram of a representative embodiment of a parallel configuration of a six-stage liquefier according to the invention.

FIG. 5 depicts a six-stage AMRR system 500 according to a representative embodiment of such a system according to the invention. A process stream 502 (e.g., hydrogen) enters the system 500 from the right in the figure. By way of example, the initial temperature of the process stream is room temperature, e.g., approximately 300 K.

The system 500 comprises six AMRR stages 504, 514, 516, 518, 520, 522. Each of the six AMRR stages has a respective hot reservoir 512. In a parallel configuration of stages, the hot-reservoir temperatures are equal (e.g., approximately 300 K, or room temperature). An improved or optimum figure of merit (FOM) of the overall system can be realized by parametric analysis of the individual stages based on practically achievable efficiencies to determine optimal or near-optimal coldest temperatures for the respective AMRR stages. This determination is done by calculating the total work from six refrigeration stages pumping heat from a separate process stream (the heat loads depend upon temperature, pressure, mass flow rate, and the particular fluid) from a respective set of six cold temperatures to a respective set of hot reservoir temperatures. The total work input is reduced by searching through the set of all combinations of the stage temperatures with approximate stage efficiencies and the associated heat loads for a given process stream. The stage efficiencies are then refined and the calculation repeated. If desired, the calculation can be refined and repeated until calculation efficiencies converge to an optimum or desired value.

By way of example, respective output temperatures of the six stages each with 100% efficiency, as used to liquefy hydrogen at a pressure of ~0.1 MPa, are as follows: the first AMRR stage 504 has a cold-reservoir temperature of 192 K; the second AMRR stage 514 has a cold-reservoir temperature of 120 K; the third AMRR stage 516 has a cold-reservoir temperature of 78 K; the fourth AMRR stage 518 has a cold-reservoir temperature of 48 K; the fifth AMRR stage 520 has a cold-reservoir temperature of 32 K; and the sixth AMRR stage 522 has a cold-reservoir temperature of 20 K. At each stage, a respective bypass-flow-control valve 524 permits counter-current heat exchange of the heat-transfer fluid with the process stream in a respective bypass fluid heat exchanger 534, thereby considerably increasing the efficiency with which the process stream is cooled.

Passive regenerators can be fabricated of materials with very large thermal masses such that in normal operation, the thermal mass does not change. In balanced regenerator operation, the heat-transfer fluid flow is the same in the cold-blow and hot-blow zones of the regenerator. In an active magnetic regenerator, the thermal mass of the respective magnetic refrigerants near their respective ordering temperatures changes due to the effects of the magnetic field. The respective differences in thermal mass of the magnetic regenerator materials below their respective ordering temperature within and outside of the magnetic field, allow more heat-transfer fluid to flow in the hot-blow zone than in the cold-blow zone. The difference in flows may be of order ten per cent of the average total regenerator heat-transfer fluid flow. This excess cold heat-transfer fluid can be returned via external heat exchangers that further cool the process stream in a continuous flow, thereby significantly increasing the thermodynamic efficiency of the liquefier.

For cooling of hydrogen, a continuous ortho-para catalytic converter 528 is associated with each AMRR stage to convert the process stream to an equilibrium concentration of the para form of hydrogen at that particular temperature. By doing this conversion continuously the efficiency of the liquefier is significantly increased. After passing through the sixth stage of refrigeration, the process-stream output 530 is, e.g., liquid hydrogen at 20 K. An external cooling fluid, supplied at an inlet 526, removes heat from the respective hot reservoirs 512 that are at or near room temperature. A cooling-fluid return outlet 532 routes the cooling fluid for heat removal (using an apparatus not shown) and subsequent return to the inlet 526.

As the process stream 502 proceeds through each AMRR stage, the process stream is cooled to the respective temperature for that stage. Within each AMRR stage the respective conveyor belt (not shown in FIG. 5, but see FIG. 1(A)) is continually moving, routing the respective magnetic refrigerating segments through a respective region of high magnetic field. As the segments pass through the hot-blow region, heat is transferred from the magnetic refrigerants to the heat-transfer fluid as the heat-transfer fluid passes through the porous regenerator segments. The heat-transfer fluid is conducted to the respective hot reservoirs or thermal sinks, where the heat-transfer fluid releases the heat to the hot reservoirs or thermal sinks.

The heat-transfer fluid is then routed back to the magnetic refrigerating segments that are passing through the respective region of low magnetic field. As the segments move from the high field region to the low field region, they undergo an adiabatic demagnetization (with no flow of heat-transfer fluid); hence each magnetic material decreases in temperature by the adiabatic temperature change for the respective material at its operating temperature. In the region of low magnetic field, the heat-transfer fluid passes from hot to cold in each segment and is cooled to below the average cold temperature for the respective segment. The heat-transfer fluid is then routed to absorb heat from the process stream. A portion of the cold heat-transfer fluid can be routed to respective bypass-fluid heat exchangers, producing further cooling of the process stream.

The process stream then continues to the next (downstream) AMRR stage of refrigeration, e.g., from the first stage 512 to the second AMRR stage 514 where the process stream is cooled to the next lower temperature. At the final stage of refrigeration (e.g., in the sixth stage 522), a latent heat of vaporization can be removed, liquefying the process stream.

Figure 6:
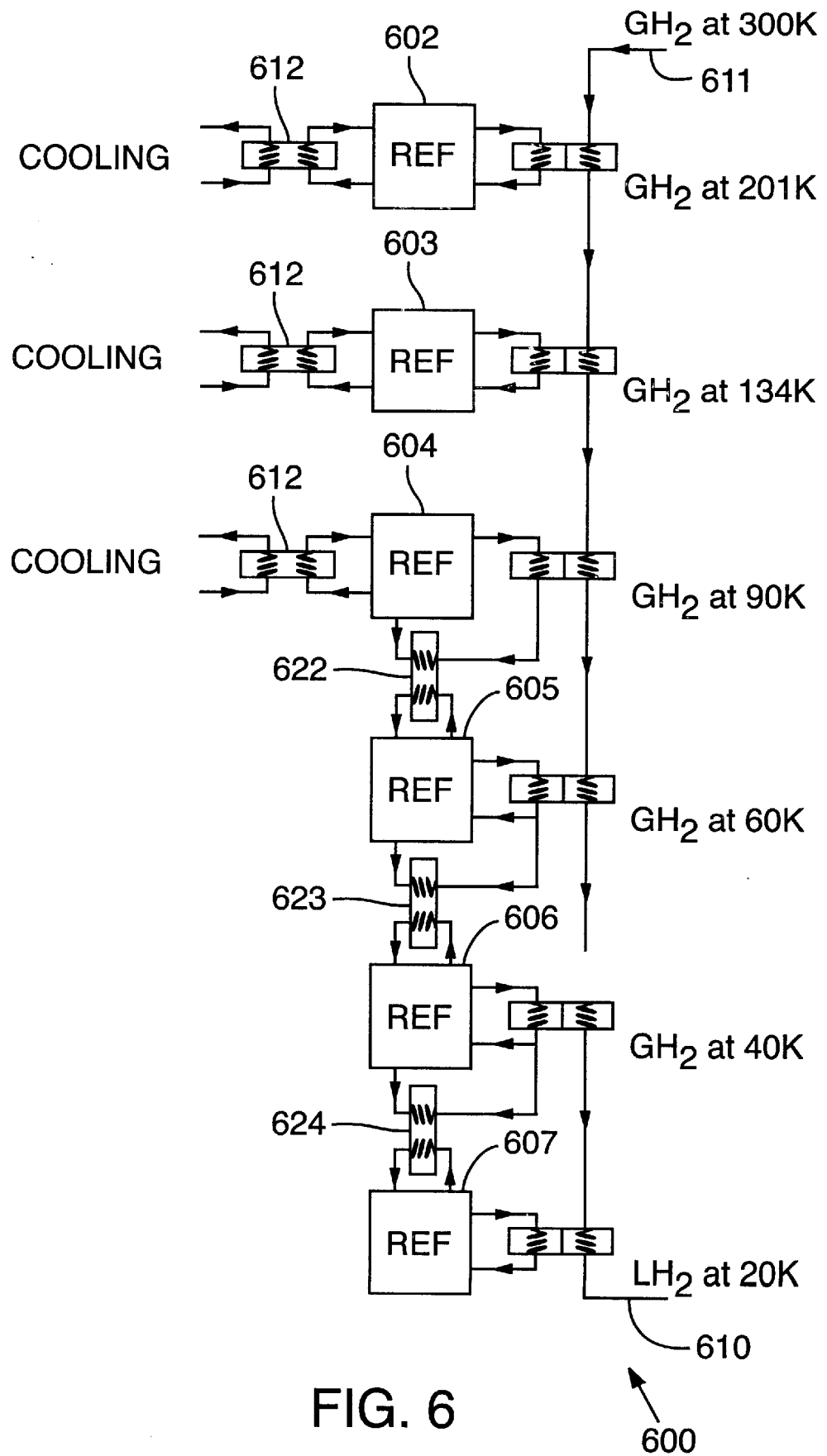
FIG. 6 is a schematic diagram of a series-parallel configuration of a six-stage liquefier.

With reference to FIG. 6, an AMRL 600 includes AMRR stages 602–607 that are configured to deliver liquid hydrogen at a temperature of about 20 K to an output 610. Hydrogen gas at a temperature of approximately 300 K is delivered to an input 612 and the to the AMRR stages 602–607. The configuration of the AMRL 600 is a series-parallel configuration in that the AMRR stages 602–604 have thermal reservoirs 612 that are at a common temperature, and the AMRR stages 604–606 are configured to provide respective thermal reservoirs 622, 623, 624 for respective downstream AMRR stages 605–607. Stage temperatures for the AMRL 600 are 300, 201 K, 90 K, 60 K, 40 K, and 20 K suitable for liquefying of hydrogen at a pressure of about 0.5 MPa. In addition, additional heat exchangers, ortho-para converters, and fluid bypass components are not shown in FIG. 6, but can be similar to those of FIG. 5.

Whereas the invention has been described in connection with representative embodiments, it will be understood that the invention is not limited to those embodiments. On the contrary, the invention is intended to encompass all modifications, alternatives, and equivalents as may be included within the spirit and scope of the invention, as defined by the appended claims.

We claim:

1. An active magnetic regenerative liquefier (AMRL), comprising:

at least a first and a second active magnetic regenerative refrigerators (AMRRs), the first AMRR configured to receive and cool a process stream, and deliver the process stream to the second AMRR, wherein the first and second AMRRs have respective thermal reservoirs at a common temperature.

2. The AMRL of claim 1, further comprising at least a third through a sixth AMRR, the fourth through sixth AMRR is configured to serially receive and cool a process stream.

3. The AMRR of claim 2, wherein the first through sixth AMRRs have respective cold reservoirs at temperatures of about 192, 120, 78, 48, 32, and 20 K, respectively.

4. The AMRL of claim 3, wherein the first through third AMRRs are arranged in parallel.

5. The AMRL of claim 4, wherein the fourth through sixth AMRRs are arranged in series.

6. The AMRL of claim 2, wherein the first through third AMRRs are arranged in parallel.

7. The AMRL of claim 4, wherein the fourth through sixth AMRRs are arranged in series.

8. A hydrogen liquefier, comprising an AMRL as recited in claim 2.

9. A hydrogen liquefier, comprising:

at least three active magnetic regenerator refrigerators (AMRRs) situated and configured to receive and serially cool a hydrogen process stream; and at least two ortho to para convertors situated between at least two of the AMRRs.

* * * * *